(12) United States Patent
Nishimura et al.

(10) Patent No.: US 9,315,228 B2
(45) Date of Patent: Apr. 19, 2016

(54) SADDLE TYPE VEHICLE

(71) Applicant: HONDA MOTOR CO., LTD., Tokyo (JP)

(72) Inventors: Shin Nishimura, Wako (JP); Masahiro Kontani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/635,775

(22) Filed: Mar. 2, 2015

(65) Prior Publication Data
US 2015/0251720 A1   Sep. 10, 2015

(30) Foreign Application Priority Data

Mar. 5, 2014  (JP) .................. 2014-042547
Jun. 6, 2014  (JP) .................. 2014-118193

(51) Int. Cl.
| B62K 11/04 | (2006.01) |
| B62K 11/00 | (2006.01) |
| F01N 3/30 | (2006.01) |
| B60K 13/02 | (2006.01) |
| F02M 23/00 | (2006.01) |
| F02B 61/02 | (2006.01) |
| F02B 75/22 | (2006.01) |

(52) U.S. Cl.
CPC .................. *B62K 11/04* (2013.01); *B60K 13/02* (2013.01); *B62K 11/00* (2013.01); *F01N 3/30* (2013.01); *F02M 23/00* (2013.01); *F01N 2590/04* (2013.01); *F02B 61/02* (2013.01); *F02B 75/22* (2013.01)

(58) Field of Classification Search
CPC ......... B62K 11/04; F02M 23/00; B60K 13/02
See application file for complete search history.

(56) References Cited

FOREIGN PATENT DOCUMENTS

JP     2007-009707 A     1/2007

*Primary Examiner* — Kevin Hurley
(74) *Attorney, Agent, or Firm* — Birch, Stewart, Kolasch & Birch, LLP

(57) ABSTRACT

A secondary air supply system is arranged efficiently and compactly, in a V-type engine including a front-side cylinder and a rear-side cylinder. A motorcycle includes an engine having a front-side cylinder and a rear-side cylinder with an air cleaner being disposed on the upper side of the engine. A secondary air supply system has a reed valve provided between the air cleaner and an exhaust passage of the engine and by which secondary air is supplied into the exhaust passage of the engine. Intake ducts for guiding air into the air cleaner are connected to left and right side surfaces of the air cleaner. The reed valve includes a front-side reed valve used for the front-side cylinder and a rear-side reed valve used for the rear-side cylinder.

20 Claims, 12 Drawing Sheets

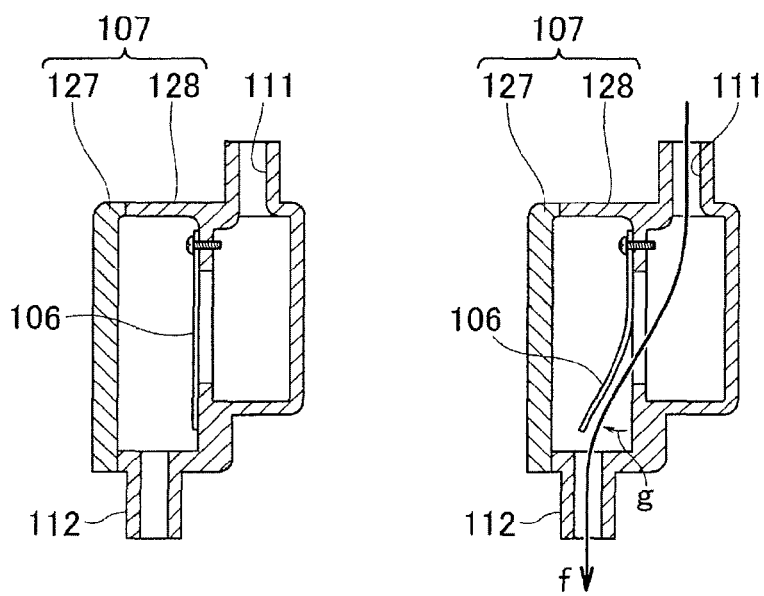
FIG. 11(a)  FIG. 11(b)
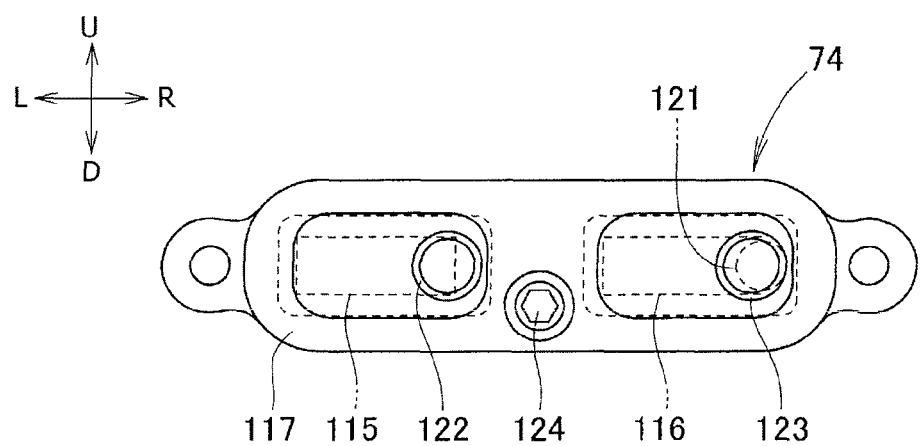
FIG. 12

SADDLE TYPE VEHICLE

CROSS-REFERENCE TO RELATED APPLICATIONS

The present application claims priority under 35 USC 119 to Japanese Patent Application No. 2014-042547 filed Mar. 5, 2014 and Japanese Patent Application No. 2014-118193 filed Jun. 6, 2014 the entire contents of which are hereby incorporated by reference.

BACKGROUND OF THE INVENTION

1. Field of the Invention

The present invention relates to an improvement in a saddle type vehicle provided with a secondary air supply system.

2. Description of Background Art

A saddle type vehicle is known that is provided with a secondary air supply system for clarifying an exhaust gas by combustion of unburned components present in the exhaust gas. See, for example, Japanese Patent No. 4704127, FIG. 2.

As shown in FIG. 2 of Japanese Patent No. 4704127, an air cleaner (17) (parenthesized reference symbols appearing herein are the reference symbols used in Japanese Patent No. 4704127) is disposed on an upper side of an engine (E) mounted on the saddle type vehicle, and a secondary air supply system is disposed between the air cleaner (17) and an exhaust passage (35) extending from the engine (E). The secondary air supply system includes a secondary air inlet passage (36) through which cleaned air is supplied into the exhaust passage (35).

The engine (E) mounted on the saddle type vehicle in Japanese Patent No. 4704127 is a two-cylinder engine in which the two cylinders are arranged in a row along the transverse direction of the vehicle. In a V-type engine in which a plurality of cylinders are arranged in a V-shaped configuration with a crankshaft at the vertex of the V shape, a preferable layout for the secondary air supply system may be different from that in the above-mentioned type.

It is desired to develop a technology that enables an efficient and compact layout of a secondary air supply system in a so-called V-type engine which includes a front-side cylinder or cylinders and a rear-side cylinder or cylinders.

SUMMARY AND OBJECTS OF THE INVENTION

It is an object of an embodiment of the present invention to provide a technology by which a secondary air supply system can be arranged efficiently and compactly in a V-type engine which includes a front-side cylinder and a rear-side cylinder.

In accordance with an embodiment of the present invention, there is provided a saddle type vehicle including a body frame with an engine mounted on the body frame, the engine including a front-side cylinder directed toward a front side of the vehicle and a rear-side cylinder directed toward a rear side of the vehicle. An air cleaner is disposed in a space defined between the front-side cylinder and the rear-side cylinder on an upper side of the engine and a secondary air supply system includes a reed valve between the air cleaner and an exhaust passage of the engine. The secondary air supply system is adapted to supply secondary air from the air cleaner into the exhaust passage of the engine or to stop the supply of the secondary air. The saddle type vehicle is characterized in that an intake duct for guiding air into the air cleaner is connected to a lateral side surface, extending across the width of the vehicle, of the air cleaner. The reed valve includes a front-side reed valve used for the front-side cylinder and a rear-side reed valve used for the rear-side cylinder. The front-side reed valve is disposed at a front portion of the air cleaner. The rear-side reed valve is disposed at a rear portion of the air cleaner.

In accordance with an embodiment of the present invention, the saddle type vehicle is characterized in that the air cleaner includes a case body and an element provided inside the case body with the case body being partitioned by the element into a clean side and a dirty side. The clean side is formed on an upper side of the case body, and the dirty side is formed on a lower side of the case body. The intake duct is connected to the dirty side, and the secondary air supply system is connected to the clean side.

In accordance with an embodiment of the present invention, the saddle type vehicle is characterized in that the secondary air supply system is provided further with a solenoid valve adapted to supply air in the clean side to the secondary air supply system or to stop the supply of the air, with the solenoid valve and the front-side reed valve being interconnected by an upstream-side front pipe line, and with the solenoid valve and the rear-side reed valve being interconnected by an upstream-side rear pipe line. A ceiling wall of the air cleaner is formed with a stepped portion provided with a difference in height, and the solenoid valve, the upstream-side front pipe line and the upstream-side rear pipe line are disposed on the side of a lower part of the stepped portion.

In accordance with an embodiment of the present invention, the saddle type vehicle is characterized in that the case body is formed, at a front-side lower portion thereof, with a recessed portion in which to dispose the front-side reed valve in such a manner so as to surround the front-side reed valve by a wall portion of the case body.

In accordance with an embodiment of the present invention, the saddle type vehicle is characterized in that the recessed portion is provided with a projection for positioning the front-side reed valve.

In accordance with an embodiment of the present invention, the saddle type vehicle is characterized in that a stay member for fastening and fixing the rear-side reed valve is provided on a rear wall of the case body.

In accordance with an embodiment of the present invention, the saddle type vehicle is characterized in that the case body is divided into an upper portion and a lower portion, with a parting face thereof being slanted with respect to a longitudinal direction of the vehicle. The front-side reed valve is disposed on a lower half of the case body, with the front-side reed valve and the rear-side reed valve being arranged at substantially equal heights.

In accordance with an embodiment of the present invention, the saddle type vehicle is characterized in that the body frame includes a head pipe, and a pair of main frames extending rearwardly from the head pipe. The engine and the air cleaner are disposed between the pair of main frames with the pair of main frames and the front-side reed valve overlapping each other in side view of the vehicle.

In accordance with an embodiment of the present invention, the saddle type vehicle is characterized in that the front-side cylinder includes a plurality of cylinders arranged in a row in a transverse direction of the vehicle. The front-side reed valve includes a plurality of reed valves arranged in a row in the transverse direction of the vehicle with the plurality of front-side reed valves being housed by a united case member.

In accordance with an embodiment of the present invention, the saddle type vehicle is characterized in that the rear-side cylinder includes a plurality of cylinders arranged in a row in a transverse direction of the vehicle. The rear-side reed valve includes a plurality of reed valves arranged in a row in the transverse direction of the vehicle with the plurality of rear-side reed valves being housed by a united case member.

In accordance with an embodiment of the present invention, the saddle type vehicle is characterized in that a fuel tank is disposed on the saddle type vehicle in such a manner so as to cover an area ranging from an upper side of the air cleaner toward a rear side of the vehicle.

In accordance with an embodiment of the present invention, the intake duct is connected to a lateral side surface, extending across the width of the vehicle, of the air cleaner. In addition, the front-side reed valve is disposed at a front portion of the air cleaner, whereas the rear-side reed valve is disposed at a rear portion of the air cleaner. Thus, the intake duct, the front-side reed valve and the rear-side reed valve are respectively disposed in different positions, namely, at the lateral side surface, the front portion and the rear portion of the air cleaner. Therefore, interference among these component parts can be prevented from occurring. In addition, it is possible to arrange the intake duct, the front-side reed valve and the rear-side reed valve efficiently and compactly.

In accordance with an embodiment of the present invention, while the case body has the dirty side formed on the lower side and the clean side formed on the upper side, the intake duct is connected to the dirty side, and the secondary air supply system is connected to the clean side formed on the upper side. Thus, the intake duct and the secondary air supply system are connected respectively to the lower side and the upper side of the air cleaner. This enables the intake duct and the secondary air supply system to be spaced away from each other. As a result, the intake duct and the secondary air supply system can be arranged efficiently, while preventing any interference between the intake duct and the secondary air supply system.

In accordance with an embodiment of the present invention, the solenoid valve, the upstream-side front pipe line and the upstream-side rear pipe line of the secondary air supply system are disposed on the side of the lower part of the stepped portion formed at the ceiling wall of the air cleaner. Since the secondary air supply system is disposed utilizing the stepped portion of the air cleaner, the secondary air supply system can be arranged compactly.

In accordance with an embodiment of the present invention, the case body is formed, at the front-side lower portion thereof, with the recessed portion in which to dispose the front-side reed valve. Since the front-side reed valve is surrounded by the recessed portion formed as part of the case body, the reed valve can be protected. In addition, interferences between the reed valve and the component parts arranged in the surroundings of the reed valve can be avoided.

In accordance with an embodiment of the present invention, the recessed portion is provided with projections for positioning the front-side reed valve. With the positioning projections thus provided, it is possible to enhance workability in assembling (or mounting) the front-side reed valve.

In accordance with an embodiment of the present invention, the stay member is provided on the rear wall of the case body, and the rear-side reed valve is fastened and fixed by the stay member. With the rear-side reed valve fastened utilizing the stay member provided as a separate body from the case body, it is unnecessary to provide a wall of the case body with an elongated surface for fixing the rear-side reed valve. As a result, a degree of freedom in regard to the shape of the case body can be secured, even in the case where the rear-side reed valve is to be mounted to the case body.

In accordance with an embodiment of the present invention, the front-side reed valve and the rear-side reed valve are arranged at substantially equal heights, notwithstanding the parting face of the case body is slanted with respect to the longitudinal vehicle direction. This makes it possible to realize a well-balanced weight distribution while rendering the case body compact in the height direction.

In accordance with an embodiment of the present invention, the main frames and the front-side reed valve overlap each other in side view of the vehicle. Since the front-side reed valve is arranged so as to be hidden behind the main frames in side view of the vehicle, the front-side reed valve can be protected on the lateral sides of the vehicle.

In accordance with an embodiment of the present invention, the plurality of the front-side reed valves are housed by the united case member. Therefore, the plurality of front-side reed valves can be arranged compactly. In addition, an increase in the number of component parts can be restrained.

In accordance with an embodiment of the present invention, the plurality of rear-side reed valves are housed by the united case member. Therefore, the plurality of rear-side reed valves can be arranged compactly. In addition, an increase in the number of component parts can be suppressed.

In accordance with an embodiment of the present invention, the fuel tank is disposed so as to cover the area ranging from the upper side to the rear side of the air cleaner where the secondary air supply system is provided. In other words, the secondary air supply system is covered by the fuel tank. Therefore, the secondary air supply system can be protected on the upper side and the rear side thereof.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 11(a) and 11(b) are sectional views taken along line 11-11 of FIG. 10;

FIG. 12 is a front view of the rear-side reed valve;

DETAILED DESCRIPTION OF THE PREFERRED EMBODIMENTS

Figure 1:
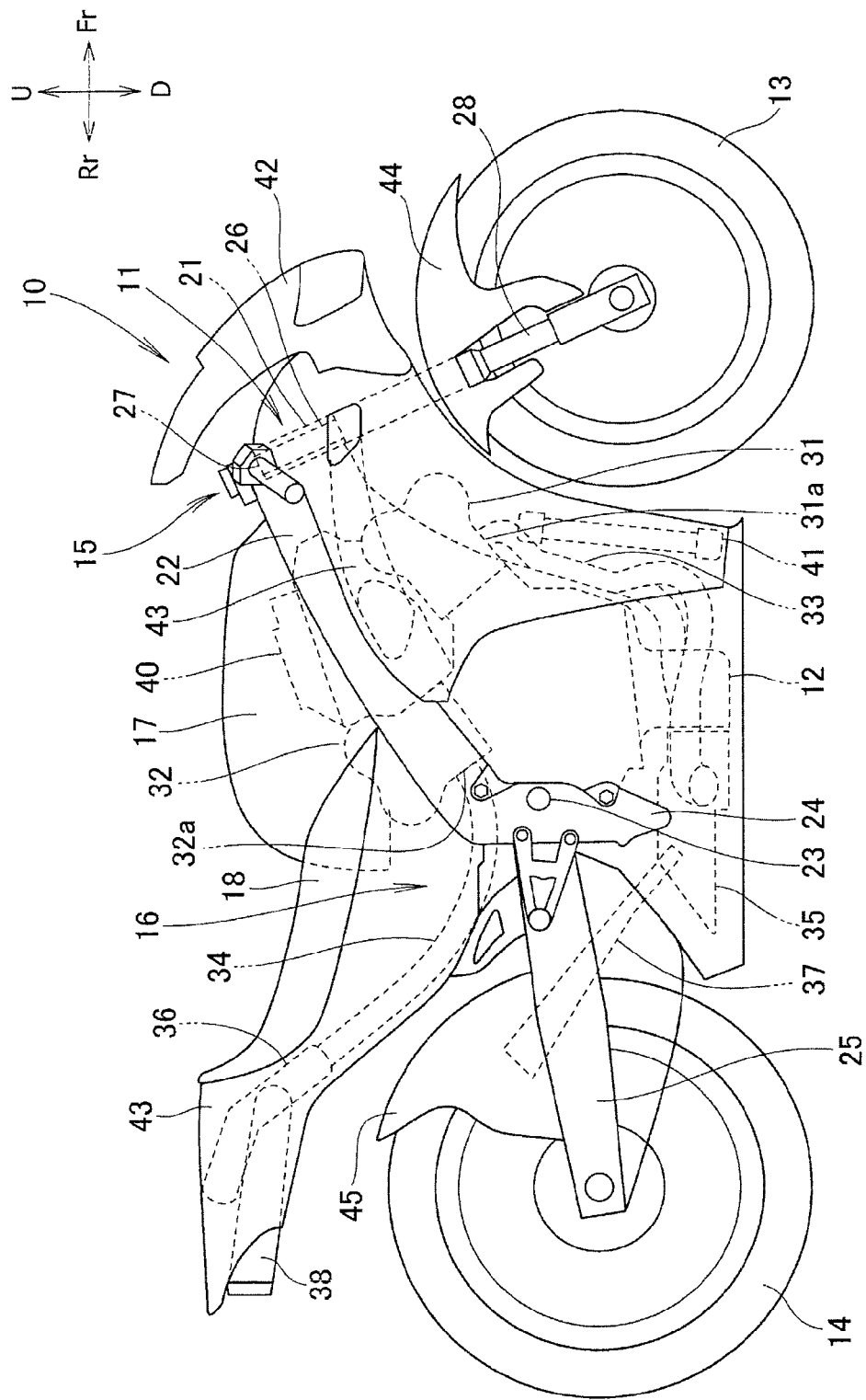
FIG. 1 is a right side view of a motorcycle according to the present invention.

Some embodiments of the present invention will be described in detail below. In the drawings and embodiments, the expressions "up (U)," "down (D)," "front (Fr)," "rear (Rr)," "left (L)" and "right (R)" are the respective directions as viewed from a rider riding on a motorcycle.

An embodiment of the present invention will be described on the basis of the drawings.

As shown in FIG. 1, a motorcycle 10 is a saddle type vehicle which includes a body frame 11; an engine 12 as a motive power source that is mounted on the body frame 11 and a front wheel steering portion 15 which is provided on a front portion of the body frame 11 forwardly of the engine 12 and by which a front wheel 13 is supported in a steerable manner. A rear wheel suspension unit 16 is provided on a rear portion of the body frame 11 and by which a rear wheel 14 is supported in a swingable manner. A fuel tank 17 is mounted to the body frame 11 upwardly of the engine 12 with a rider's seat 18 mounted to the body frame 11 rearwardly of the fuel tank 17. A rider rides the vehicle astride the rider seat 18.

The body frame 11 is composed mainly of a head pipe 21; a pair of left and right main frames 22 extending rearwardly from the head pipe 21 and a pivot frame 24 which extends downwardly from rear ends of the main frames 22 and which supports a pivot shaft 23 serving as a support shaft for the rear wheel suspension unit 16.

The rear wheel suspension unit 16 has a swing arm 25 which extends rearwardly from the pivot shaft 23 and supports the rear wheel 14 on a rear end thereof. The front wheel steering portion 15 includes a steering shaft 26 passed through the head pipe 21 and serving as a rotational shaft with a steering handle 27 mounted to an upper end of the steering shaft 26. A front fork 28 is provided as one body with the steering shaft 26, that extends forward and downward, and supports the front wheel 13.

The engine 12 mounted on the body frame 11 is a so-called V-type engine which includes a front-side cylinder 31 directed toward a front side of the vehicle and a rear-side cylinder 32 directed toward a rear side of the vehicle. A front-side cylinder exhaust pipe 33 is connected to an exhaust port 31a of the front-side cylinder 31. The front-side cylinder exhaust pipe 33 extends in a forward direction and then extends while bending so as to point rearwardly. A chamber 35 on one side, in which a catalyzer is incorporated, is connected to a rear end of the front-side cylinder exhaust pipe 33. A muffler 37 on one side extends rearwardly from the chamber 35. The rear-side cylinder 32 includes a plurality of cylinders (two cylinders) arranged in a row in the transverse direction of the vehicle. A rear-side cylinder exhaust pipe 34 for guiding an exhaust gas is connected to an exhaust port 32a of the rear-side cylinder 32. The rear-side cylinder exhaust pipe 34 extends rearwardly, and a muffler 38 on the other side is connected thereto through a chamber 36 on the other side, in which a catalyzer is incorporated. An air cleaner 40 is disposed in a space defined between the front-side cylinder 31 and the rear-side cylinder 32, on an upper side of the engine 12.

A radiator unit 41 is disposed rearwardly of the front wheel 13 and forwardly of the engine 12. A front side of a vehicle body is covered with a cowl 42, and lateral sides of the vehicle body are covered with a body cover 43. A front fender 44 is mounted to the front fork 28 so as to cover an upper side of the front wheel 13. A rear fender 45 is mounted to the swing arm 25 so as to cover a front upper side of the rear wheel 14.

Figure 2:
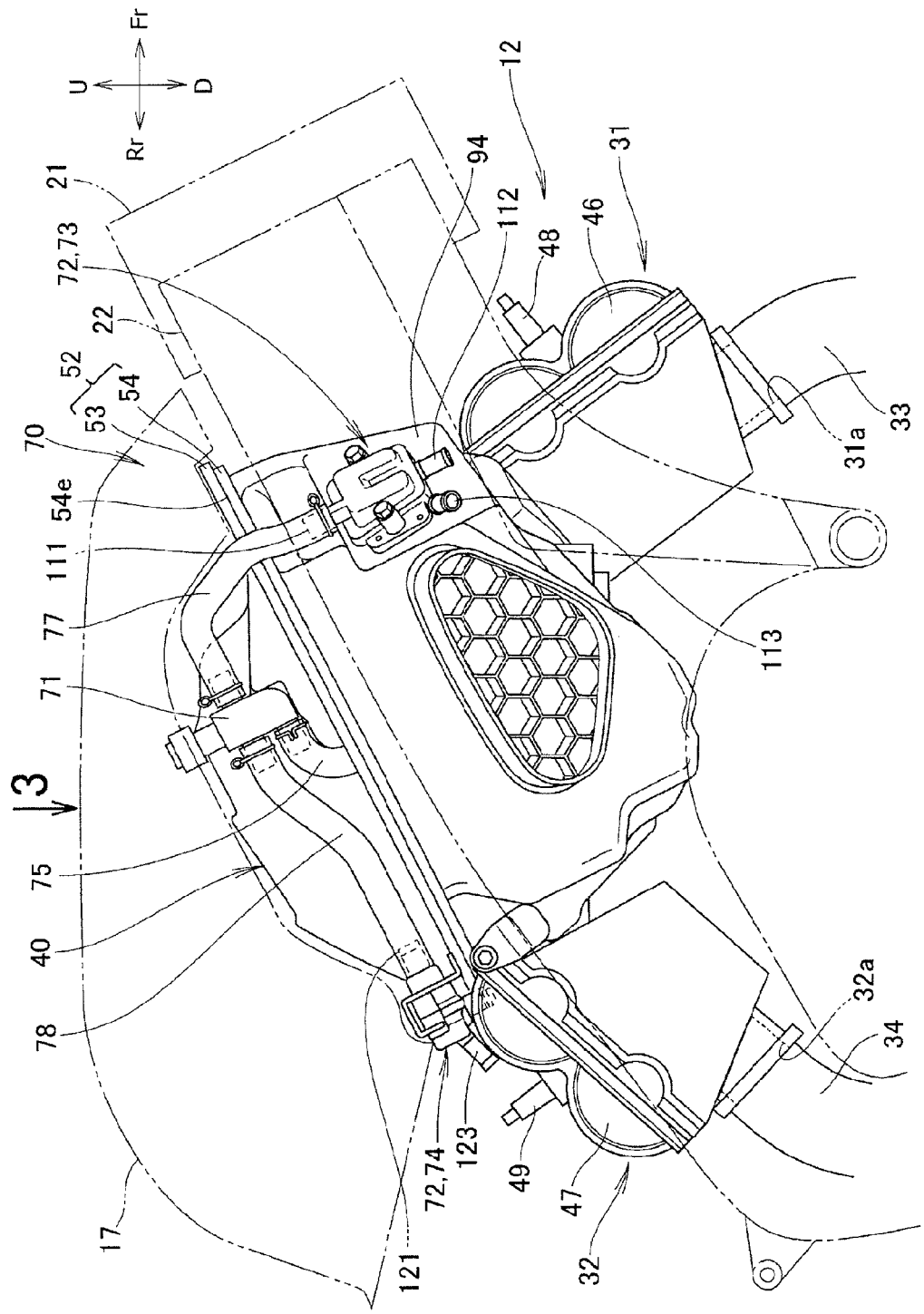
FIG. 2 is a major part enlarged view showing an air cleaner and the surroundings thereof.

As shown in FIG. 2, an upper end of the front-side cylinder 31 of the engine 12 is covered with a front-side head cover 46, and a front igniter 48 is installed on the front-side head cover 46. Similarly, an upper end of the rear-side cylinder 32 is covered with a rear-side head cover 47, and a rear igniter 49 is installed on the rear-side head cover 47.

The front-side cylinder 31 includes a plurality of cylinders (two cylinders) arranged in a row in the transverse direction of the vehicle. The front-side cylinder exhaust pipe 33 for guiding the exhaust gas is connected to the exhaust port 31a of the front-side cylinder 31. The rear-side cylinder 32 includes a plurality of cylinders (two cylinders) arranged in a row in the transverse direction of the vehicle. The rear-side cylinder exhaust pipe 34 for conducting the exhaust gas is connected to the exhaust port 32a of the rear-side cylinder 32. Thus, the front-side cylinder 31 includes the two cylinders arranged in a row in the transverse direction of the vehicle, and the rear-side cylinder 32 includes the two cylinders arranged in a row in the transverse direction of the vehicle. In other words, the engine 12 is a front-two-cylinder, rear-two-cylinder V-type engine.

In an area ranging from an upper side of the air cleaner 40 (which is disposed in the space defined between the front-side cylinder 31 and the rear-side cylinder 32 on the upper side of the engine 12) toward the rear side of the vehicle, the fuel tank 17 is disposed in such a manner as to over the air cleaner 40.

Figure 3:
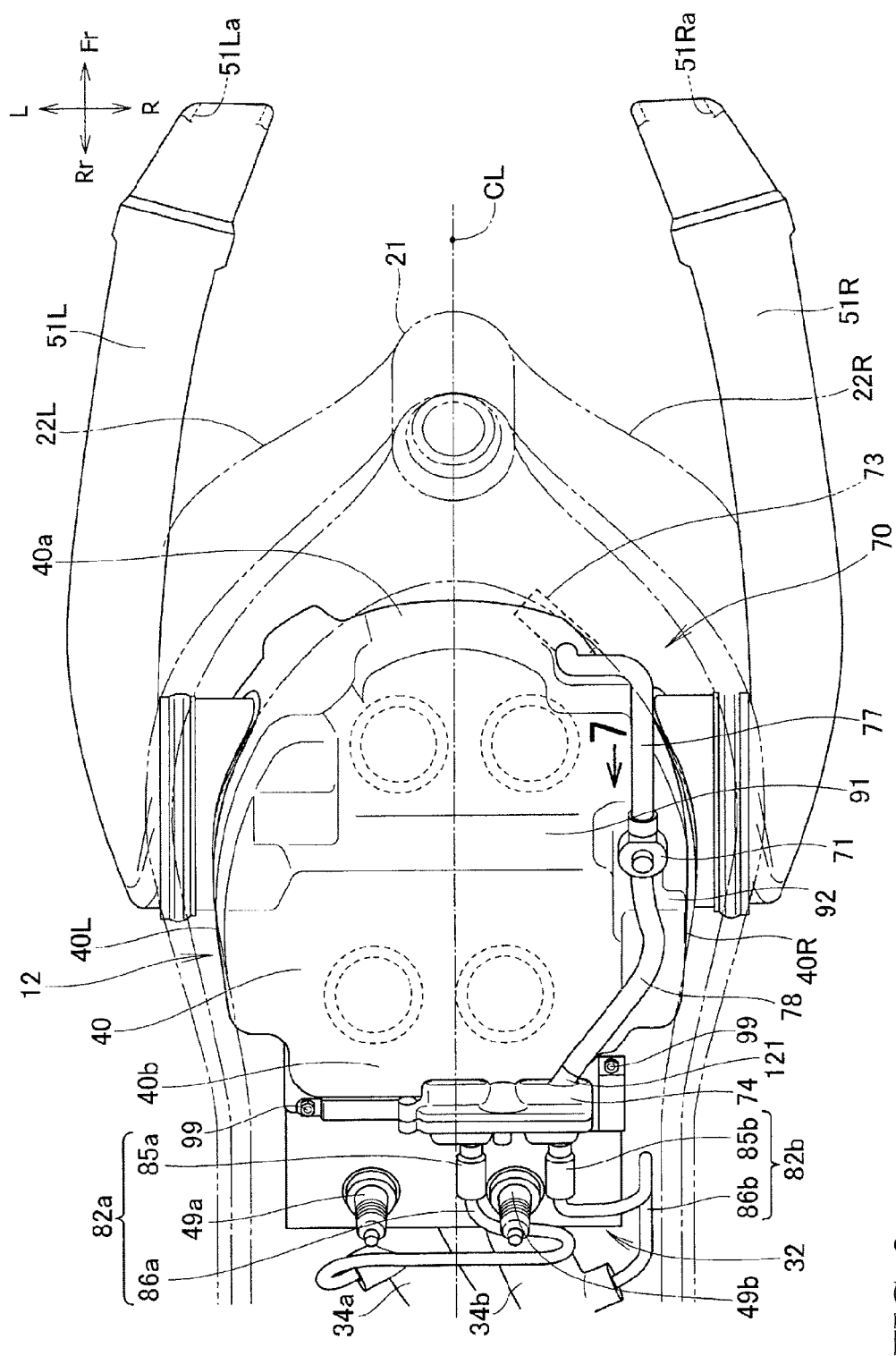
FIG. 3 is a plan view of the air cleaner and the surroundings thereof, which is a view along arrow 3 of FIG. 2.

As depicted in FIG. 3, the engine 12 and the air cleaner 40 are disposed between the pair of main frames 22L and 22R. Intake ducts 51L and 51R for introducing air into the air cleaner 40 are connected to side surfaces 40L and 40R (extending across the width of the vehicle) of the air cleaner 40. The intake ducts 51L and 51R are provided with intake ports 51La and 51Ra at front ends thereof.

The structure of the air cleaner will be mainly described below.

Figure 4:
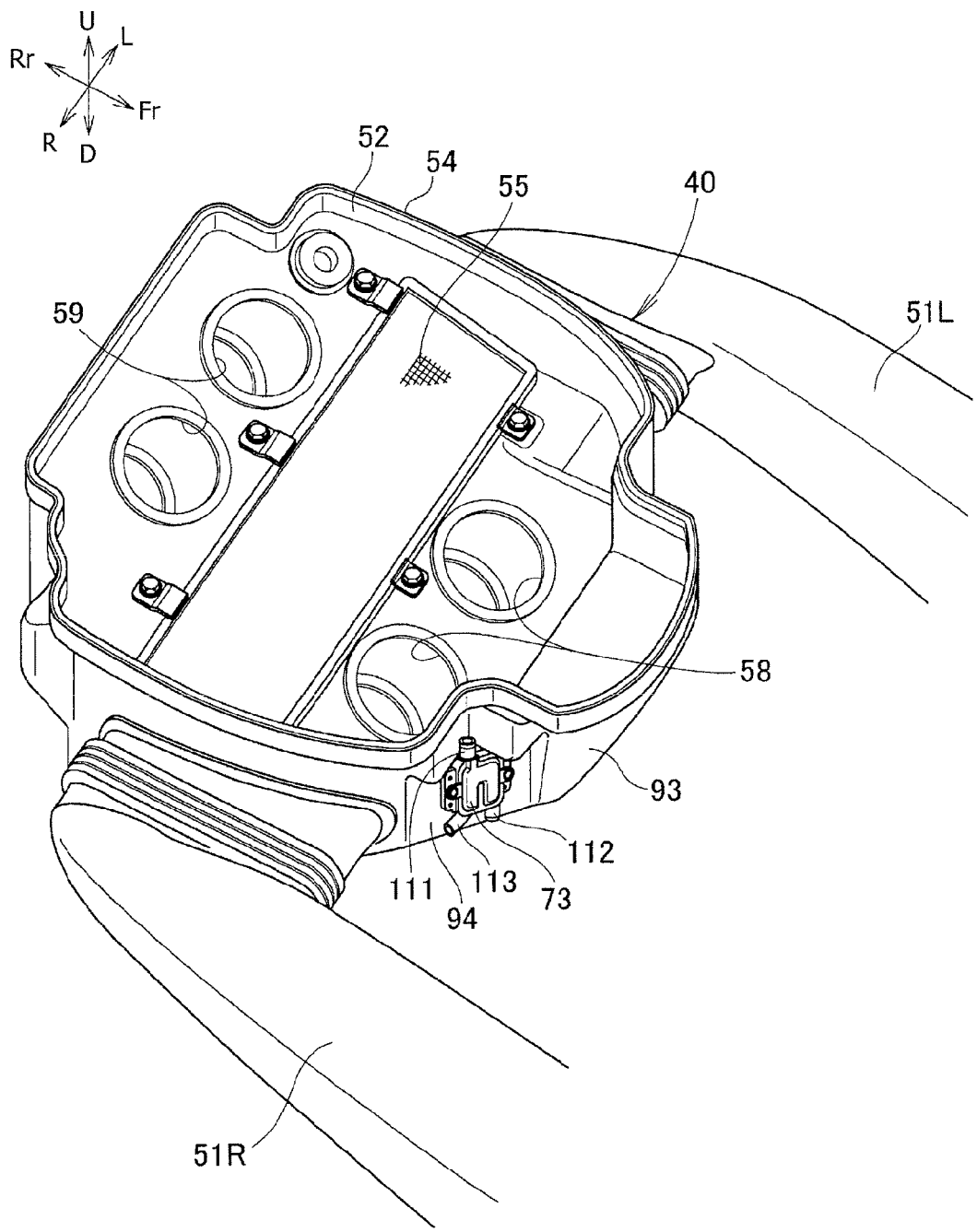
FIG. 4 is a perspective view for explaining the structure of the air cleaner.
Figure 5:
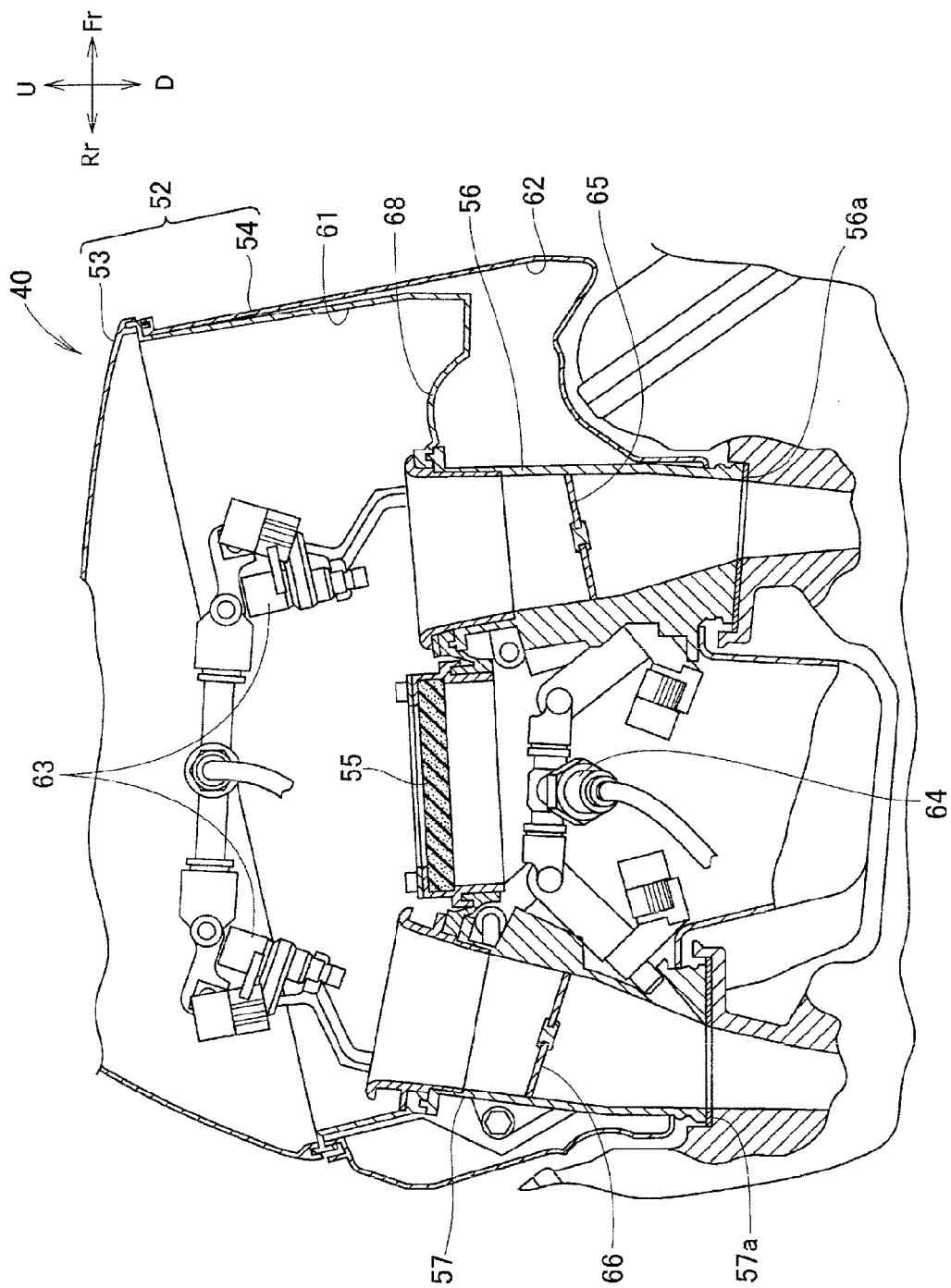
FIG. 5 is a sectional view for explaining the structure of the air cleaner.

As shown in FIGS. 4 and 5, the air cleaner 40 has a case body 52 and an element 55 provided inside the case body 52 so as to filtrate air, thereby cleaning the air. The case body 52 has an upper half 53 and a lower half 54 abutted on each other from the upper and lower sides. On the front and rear sides of the element 55, there are provided front and rear funnel holes 58 and 59 to which front funnels 56 and rear funnels 57 for supplying cleaned air to the front-side cylinder 31 and the rear-side cylinder 32 are mounted in an inserted manner.

The case body 52 is partitioned by the element 55 and a partition wall 68 into a clean side 61 and a dirty side 62. The clean side 61 is defined on the upper side in the case body 52, whereas the dirty side 62 is defined on the lower side in the case body 52. First injection nozzles 63 for supplying an atomized fuel are provided inside the case body 52 in such positions as to be exposed to inlets of the front and rear funnels 56 and 57. A second injection nozzle 64 is provided downstream of the first injection nozzles 63. At intermediate portions in the axial direction in the front and rear funnels 56 and 57, throttle valves 65 and 66 are provided between the first injection nozzle 63 and the second injection nozzle 64. A front seal member 56a for preventing leakage of intake air is interposed between the front-side cylinder 32 of the engine 12 (see FIG. 2) and the front funnel 56. Similarly, a rear seal member 57a for preventing leakage of intake air is interposed between the rear-side cylinder 32 of the engine 12 and the rear funnel 57.

Air taken into the dirty side 62, which constitutes a lower half of the air cleaner 40, from lateral sides of the air cleaner 40 via the intake ducts 51L and 51R is filtered by the element 55 when flowing through the element 55 into the clean side 61 which constitutes an upper half of the air cleaner 40. The filtered clean air then flows toward the intake side of the engine 12 (see FIG. 2) by way of the front and rear funnels 56 and 57 disposed so as to be exposed to the clean side 61.

A secondary air supply system for clarifying the exhaust gas by combustion of combustible components present in the exhaust gas will be described below.

As illustrate in FIGS. 2 and 3, a secondary air supply system 70 includes a solenoid valve 71 for supplying the cleaned air in the air cleaner 40 to an exhaust system or stopping the supply of the cleaned air with reed valves 72 being provided downstream of the solenoid valve 71 that are individually opened and closed depending on negative pressures in the exhaust passages (at the exhaust ports 31a and 32a) of the engine 12. The reed valves 72 include a front-side reed valve 73 and a rear-side reed valve 74. The front-side reed valve 73 is disposed at a front portion 40a of the air cleaner 40, and the rear-side reed valve 74 is disposed at a rear portion 40b of the air cleaner 40.

The air cleaner 40 and the solenoid valve 71 are interconnected by a connection pipe line 75 for supplying the cleaned air from the air cleaner 40 to the solenoid valve 71. The solenoid valve 71 and the front-side reed valve 73 are interconnected by an upstream-side front pipe line 77. The solenoid valve 71 and the rear-side reed valve 74 are interconnected by an upstream-side rear pipe line 78.

Figure 6:
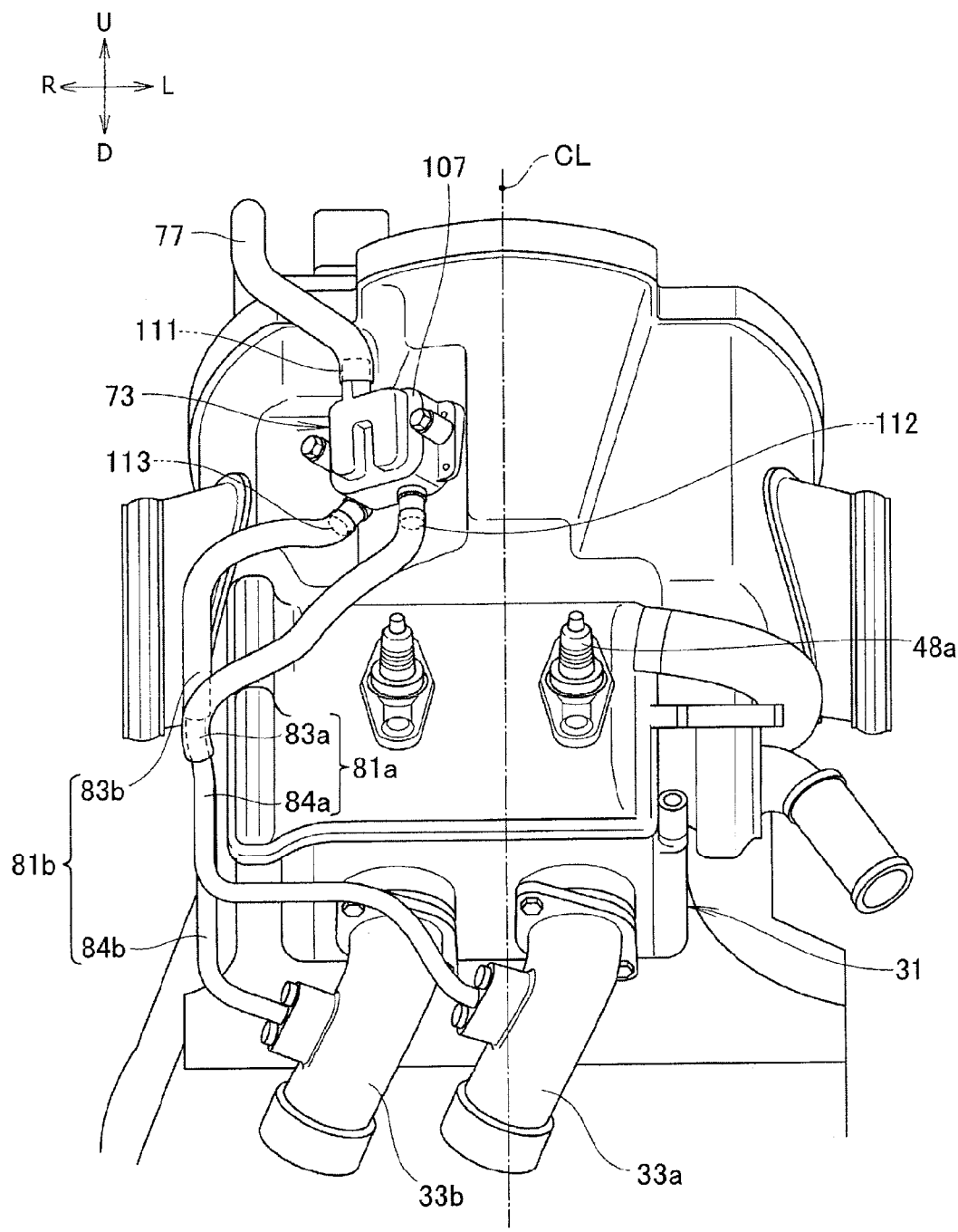
FIG. 6 is a front view of the air cleaner and the surroundings thereof.

As shown in FIG. 6, front pipe line members 81a and 81b extend from the front-side reed valve 73. Tips of the front pipe line members 81a and 81b are connected to the respective exhaust passages (the front-side cylinder exhaust pipes 33) of the engine 12. As illustrated in FIG. 3, rear pipe line members 82a and 82b extend from the rear-side reed valve 74. Tips of the rear pipe line members 82a and 82b are connected to the respective exhaust passages (the rear-side cylinder exhaust pipes 34) of the engine 12. The rear-side reed valve 74 and the rear-side cylinder exhaust pipe 34 are interconnected by the rear pipe line member 82. In other words, the reed valve 72 is disposed between the air cleaner 40 and the exhaust passage of the engine 12, in such a position so as to be exposed to the exhaust passage.

More specifically, the reed valve 72 includes the front-side reed valve 73 and the rear-side reed valve 74. The front-side reed valve 73 and the rear-side reed valve 74 are used for the front-side cylinders 31 and the rear-side cylinders 32, respectively, so as to supply secondary air from the air cleaner 40 into the exhaust passages of the engine 12.

In FIGS. 1 and 6, the front-side cylinder exhaust pipe 33 extends in a forward direction and then extends while bending so as to point rearwardly with a deviation to a right side with respect to the center line across the width of the vehicle. The front-side reed valve 73 is disposed with an offset to the right side, namely, the same side, with respect to the center line across the width of the vehicle, as the deviation of the front-side cylinder exhaust pipe 33. The front-side reed valve 73 is connected to the front-side cylinder exhaust pipes 33a and 33b by the front pipe line members 81a and 81b, respectively. In the drawing, reference character CL denotes a center line across the width of the vehicle. Note that while the front-side cylinder exhaust pipes and the front-side reed valve are disposed with an offset toward the right side with respect to the center line across the width of the vehicle in this embodiment, they may be disposed with an offset toward the left side with respect to the center line.

The front pipe line members 81a and 81b include front tubes 83a and 83b which extend from the front-side reed valve 73 and are made of an elastic material with a low thermal conductivity, such as rubber tubes and metallic front tubes 84a and 84b which extend from tips of the elastic material-made front tubes 83a and 83b and are connected to the front-side cylinder exhaust pipes 33a and 33b, respectively. Since those portions of the front pipe line members 81a and 81b which are connected to the front-side reed valve 73 are composed of the elastic material-made front tubes 83a and 83b, thermal influence on the front-side reed valve 73 due to heat conduction from the front-side cylinder exhaust pipes 33a and 33b can be reduced. In addition, transfer of vibrations from the front-side cylinder exhaust pipes 33a and 33b to the front-side reed valve 73 is suitably restrained.

The front-side reed valve 73 and the front-side cylinder exhaust pipes 33a and 33b are both disposed on the right side of the center line across the width of the vehicle, and they are interconnected by the front pipe line members 81a and 81b. Therefore, the lengths of the front pipe line members 81a and 81b for connecting the front-side reed valve 73 to the front-side cylinder exhaust pipes 33a and 33b can be made shorter. In addition, the front pipe line members 81a and 81b can be confirmed (checked) from an outer side with respect to the center line across the width of the vehicle, leading to an enhanced maintainability.

As illustrated in FIG. 3, the rear pipe line members 82a and 82b interconnecting the rear-side reed valve 74 and the rear-side cylinder exhaust pipes 34a and 34b extend from the front side toward the rear side of the vehicle, on a lateral side of the rear igniters 49a and 49b.

The rear pipe line members 82 include: rear tubes 85a and 85b which extend from the rear-side reed valve 74 and are made of an elastic material with a low thermal conductivity, such as rubber tubes with the metallic rear tubes 86a and 86b extending from tips of the elastic material-made rear tubes 85a and 85b and being connected to the rear-side cylinder exhaust pipes 34a and 34b, respectively. Since those portions of the rear pipe line members 82a and 82b which are connected to the rear-side reed valve 74 are composed of the elastic material-made rear tubes 85a and 85b, the thermal influence on the rear-side reed valve 74 due to heat conduction from the rear-side cylinder exhaust pipes 34a and 34b can be reduced. In addition, transfer of vibrations from the rear-side cylinder exhaust pipes 34 to the rear-side reed valve 74 is suitably restrained.

As illustrated in FIG. 2, the front-side reed valve 73 is disposed on the lower half 54 of the case body 52. In addition, the front-side reed valve 73 and the rear-side reed valve 74 are disposed at substantially equal heights. The pair of main frames 22 and the front-side reed valve 73 are disposed in such positions as to overlap each other in side view of the vehicle.

The case body 52 is divided into the upper half 53 and the lower half 54, with a parting face 54e thereof being slanted down rearwardly, in relation to a horizontal plane extending in the longitudinal direction of the vehicle. In addition, the front-side reed valve 73 and the rear-side reed valve 74 are disposed on the case body 52 at substantially equal heights.

Notwithstanding the parting face 54e of the case body 52 is slanted along the longitudinal direction of the vehicle, the front-side reed valve 73 and the rear-side reed valve 74 are disposed substantially at the same height. This layout makes it possible to realize a well-balanced weight distribution while rendering the case body 52 compact in the height direction.

In FIGS. 1 and 3, the rear-side cylinder exhaust pipes 34a and 34b extend rearwardly with a deviation toward the right side with respect to the center line across the width of the vehicle, and the rear-side reed valve 74 is disposed with an offset to the right side, namely, the same side, with respect to the center line across the width of the vehicle, as the deviation of the rear-side cylinder exhaust pipes 34.

The rear-side cylinder exhaust pipes 34a and 34b and the rear-side reed valve 74 are thus disposed with a deviation to a right side, namely, with an offset toward the same side with respect to the center line across the width of the vehicle. This layout enables a simplification of the piping regarding the rear pipe line members 82a and 82b for interconnecting the rear-side reed valve 74 and the rear-side cylinder exhaust pipes 34a and 34b.

The layout of the solenoid valve and the surroundings thereof will be mainly described below.

Figure 7:
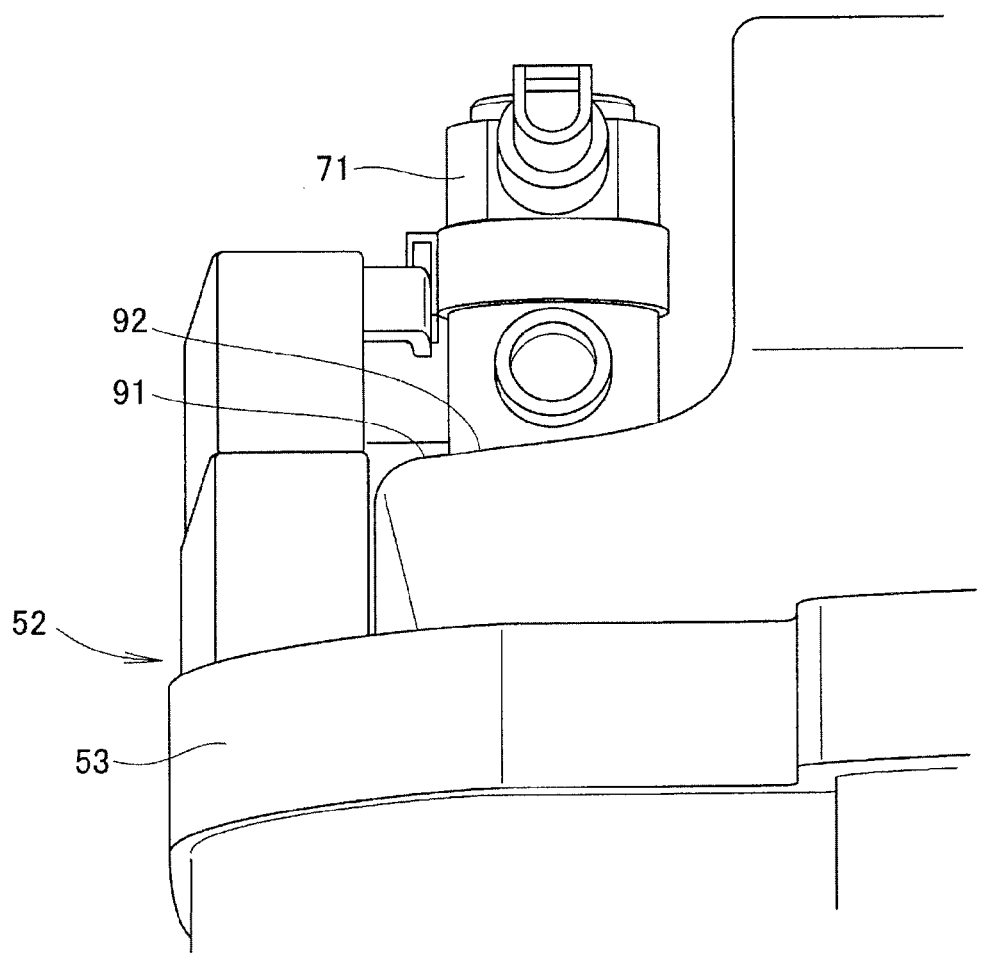
FIG. 7 is a view along arrow 7 of FIG. 3, for explaining a stepped portion formed at an upper surface of the air cleaner.

As depicted in FIG. 7, a ceiling wall 91 constituting the upper half 53 of the air cleaner case (case body 52) is formed with a stepped portion 92 where a difference in height is provided. In FIG. 7, the upstream-side front pipe line is omitted. Referring to FIG. 3, the solenoid valve 71, the upstream-side front pipe line 77 and the upstream-side rear pipe line 78 are disposed on the side of a lower part of the stepped portion 92.

Thus, the solenoid valve 71, the upstream-side front pipe line 77 and the upstream-side rear pipe line 78 are disposed on the side of the lower part of the stepped portion 92 formed as part of the ceiling wall 91 of the air cleaner 40. Since the secondary air supply system 70 is disposed utilizing the lower part side of the stepped portion 92 of the air cleaner 40, the secondary air supply system 70 can be compactly arranged.

A mounting structure for the front-side reed valve will be mainly described below.

Figure 8:
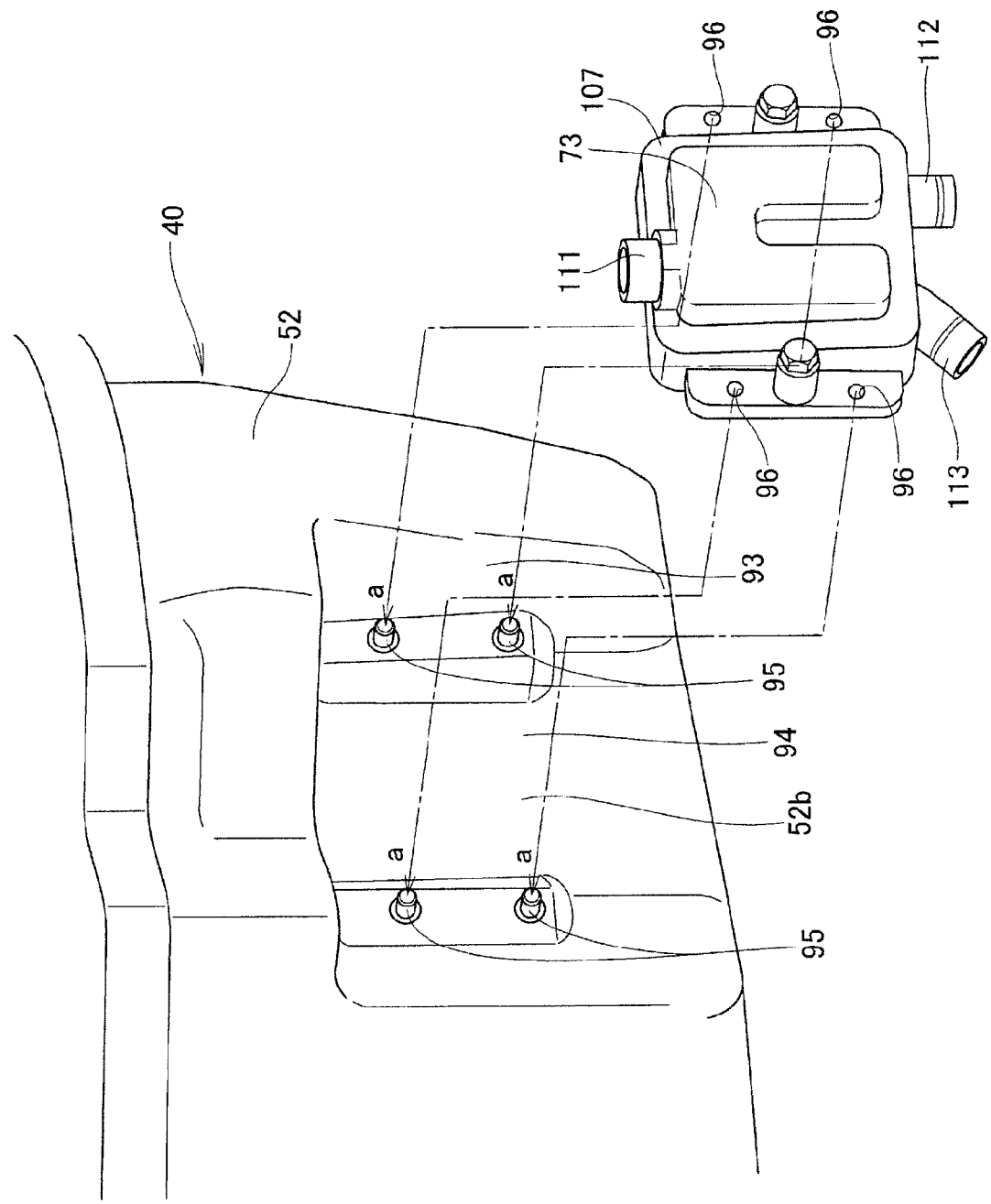
FIG. 8 is an exploded perspective view for explaining a mounting structure of a front-side reed valve.

As illustrated in FIG. 8, the case body 52 of the air cleaner 40 is formed, at a front-side lower portion 52b thereof, with a recessed portion 94 in which to dispose the front-side reed valve 73 in such a manner as to surround the front-side reed valve 73 by a wall portion 93 of the case body 52. The recessed portion 94 is provided with four projections 95 for positioning the front-side reed valve 73.

Thus, the recessed portion 94 in which to dispose the front-side reed valve 73 is formed at the front-side lower portion 52b of the case body 52. Since the front-side reed valve 73 is surrounded utilizing the recessed portion 94 formed in the case body 52, it is possible to protect the reed valve 72 and to avoid interference between the reed valve 72 and component parts arranged in the surroundings thereof.

In addition, the recessed portion 94 is provided with the four projections 95 for positioning the front-side reed valve 73. At the time of assemblage, four positioning holes 96 provided in the front-side reed valve 73 are fitted over the positioning projections 95 along the direction of arrows a in FIG. 8. In this case, the positioning projections 95 enable the front-side reed valve 73 to be easily mounted onto the front-side lower portion 52b of the case body 52. Accordingly, the workability in assembling (or mounting) the front-side reed valve 73 can be enhanced.

A mounting structure for the rear-side reed valve will be mainly described below.

Figure 9:
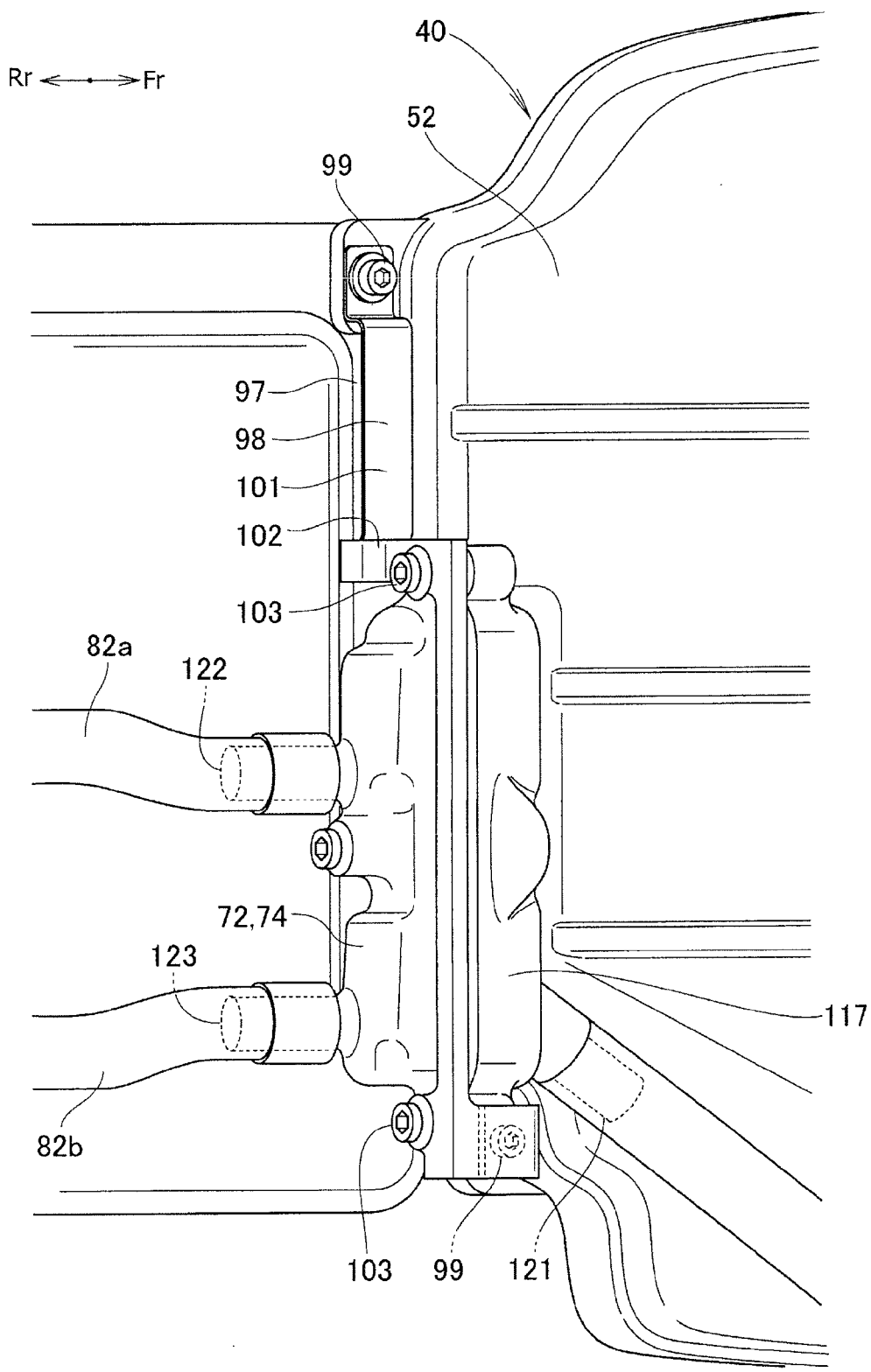
FIG. 9 is a view for explaining a mounting structure of a rear-side reed valve.

As shown in FIG. 9, a stay member 98 is provided on a rear wall 97 of the case body 52. The rear-side reed valve 74 is fastened to the rear wall 97 of the case body 52, through the stay member 98 therebetween, by screw members 99. The stay member 98 is a member extending in the transverse direction of the vehicle. The stay member 98 includes an air cleaner-side mounting portion 101 which is fastened to the rear wall 97 of the case body 52 with a reed valve-side mounting portion 102 extending upwardly from the air cleaner-side mounting portion 101 (toward the viewer's side of the drawing) and to which the rear-side reed valve 74 is fastened. The rear-side reed valve 74 is mounted to the reed valve-side mounting portion 102 by fastening members 103.

The rear-side reed valve 74 is thus fastened to the case body 52 utilizing the stay member 98, which is a separate member from the case body 52. This makes it unnecessary to provide a wall of the case body 52 with an elongated surface for fixing the rear-side reed valve 74 thereto. As a result, a degree of freedom in regard to the shape of the case body 52 can be secured, even in the case where the rear-side reed valve 74 is to be mounted to the case body 52.

The front-side reed valve will be described below.

Figure 10:
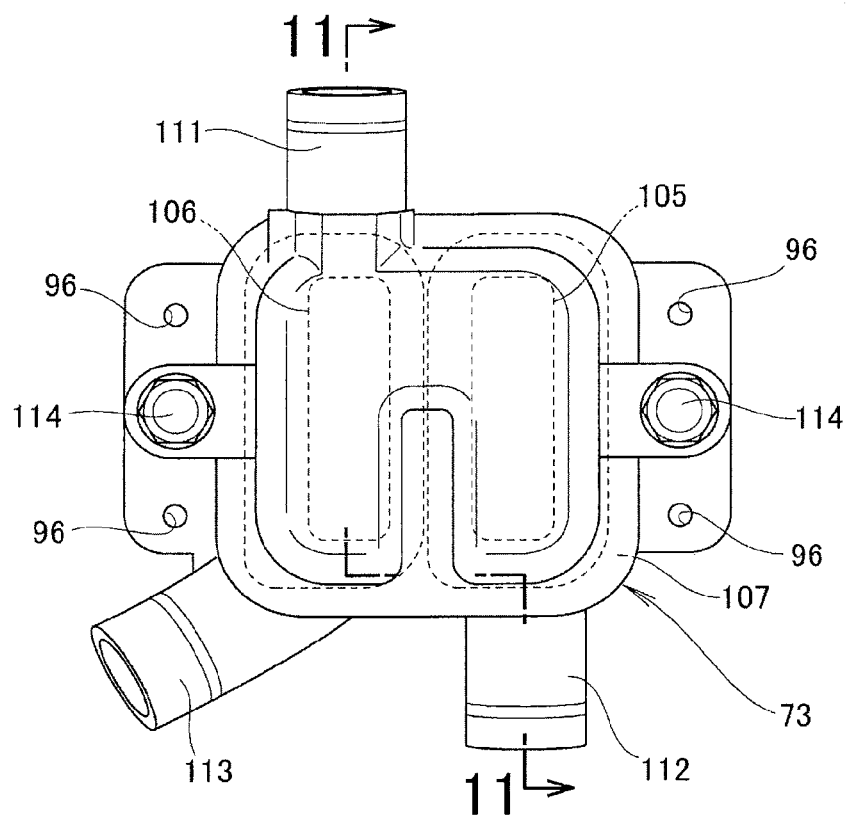
FIG. 10 is a front view of the front-side reed valve.

As illustrated in FIG. 10, the front-side reed valve 73 has left and right valve bodies 105 and 106 disposed so that the longitudinal direction of the front-side reed valve 73 lies in the vertical direction. The surroundings of the valve bodies 105 and 106 are covered with a front case member 107. The front case member 107 has one half 127 (see FIG. 11) and the other half 128 (see FIG. 11) which are fastened together by two screws 114. The front case member 107 is provided at an upper position thereof with a front input port 111 into which to insert the upstream-side front pipe line 77 (see FIG. 6). The front case member 107 is provided at lower positions thereof with a front first output port 112 and a front second output port 113 into which the front pipe line members 81a and 81b (see FIG. 6) are to be inserted and which serve as outlets for air outputted from the left and right valve bodies 105 and 106, respectively.

FIGS. 11(a) and 11(b) are sectional views taken along line 11-11 of FIG. 10, wherein FIG. 11(a) shows a state where the reed valve is closed, and FIG. 11(b) shows a state where the reed valve is open.

In FIGS. 10 and 11(a), the front-side reed valve 73 includes a plurality of reed valves (valve bodies 105 and 106) that are arranged in a row in the transverse direction of the vehicle. The valve bodies 105 and 106 are so arranged that the longitudinal direction of the front-side reed valve 73 is set along the height direction. The plurality of reed valves 105 and 106 constituting the front-side reed valve 73 are housed by the front case member 107 which is a separate body. The front case member 107 has the one half 127 and the other half 128, which are fastened together by the screws 114 to form the case member 107 as a united body.

As illustrated in FIGS. 3 and 6, the front-side cylinder 31 includes two cylinders arranged in a row in the transverse direction of the vehicle. In addition, the front-side reed valve 73 includes the two reed valves 105 and 106 which are used respectively for the front-side cylinder exhaust pipes 33a and 33b extending from the two cylinders arranged in a row in the transverse direction of the vehicle.

In FIG. 11(b), when the solenoid valve 71 (see FIG. 3) is opened under predetermined conditions and a negative pressure is exerted on the exhaust port 31a (see FIG. 2), the valve body 106 is moved in the direction of arrow g in FIG. 11(b) by the negative pressure, so that cleaned air flows in the direction of arrow f in FIG. 11(b), from the front input port 111 toward the side of the front first and front second output ports 112 and 113, in the air cleaner 40.

The rear-side reed valve will be described below.

As shown in FIG. 12, the rear-side reed valve 74 has left and right valve bodies 115 and 116 so disposed that the longitudinal direction of the rear-side reed valve 74 lies in the transverse direction of the vehicle. The surroundings of the valve bodies 115 and 116 are covered with a rear case member 117. In the same manner as in the aforementioned front-side reed valve, the rear case member 117 has one half and the other half fastened together by a screw 124. The rear case member 117 is provided, on a front side, with a rear input port 121 into which to insert the upstream-side rear pipe line 78. The rear case member 117 is provided, on a rear side, with a first output port 122 and a second output port 123 into which the rear pipe line members 82a and 82b (see FIG. 3) are inserted and which serve as outlets for air outputted from the left and right valve bodies 115 and 116, respectively.

More specifically, the rear-side reed valve 74 includes a plurality of reed valves (valve bodies 115 and 116) that are arranged in a row in the transverse direction of the vehicle so that the longitudinal direction of the rear-side reed valve 74 lies along the transverse direction of the vehicle. The rear-side reed valve 74 is housed by the rear case member 117 which is a united body. The operation of the rear-side reed valve 74 is similar to that of the aforementioned front-side reed valve, so that description thereof is omitted here.

Since the plurality of the rear-side reed valves (valve bodies 115 and 116) are housed by the case member 117 which is a united body, the plurality of rear-side reed valves (valve bodies 115 and 116) can be arranged compactly. In addition, an increase in the number of component parts can be restrained.

As illustrated in FIG. 3, the rear-side reed valve 74 includes the plurality of reed valves (valve bodies 115 and 116) corresponding to the plurality of rear-side cylinders 32 that are arranged in a row in the transverse direction of the vehicle. The plurality of reed valves (valve bodies 115 and 116) are arranged in a row in the transverse direction of the vehicle. Therefore, the rear pipe line members 82a and 82b interconnecting the rear-side exhaust pipes (rear-side cylinder exhaust pipes 34) and the rear-side reed valve 74 can be arranged compactly and efficiently.

As illustrated in FIGS. 2 and 3, in the present invention, in the case where a space surrounded by the main frames 22 and the air cleaner 40 has a margin in the height direction, the reed valves (valve bodies 105 and 106) are arranged so that the longitudinal direction of the reed valves (valve bodies 105 and 106) lies in the height direction. In the case where the space surrounded by the main frames 22 and the air cleaner 40 has a margin in the transverse direction of the vehicle, on the other hand, the reed valves (valve bodies 115 and 116) are so arranged that the longitudinal direction of the reed valves (valve bodies 115 and 116) lies in the transverse direction of the vehicle.

The rear-side cylinder 32 includes two cylinders that are arranged in a row in the transverse direction of the vehicle. The rear-side reed valve 74 includes the two reed valves 115 and 116 that are used respectively for rear-side cylinder exhaust pipes 34 extending from the two cylinders arranged in a row in the transverse direction of the vehicle.

Since the plurality of front-side reed valves (valve bodies 105 and 106) are housed by the front case member 107 which is a united body, the plurality of front-side reed valves (valve bodies 105 and 106) can be compactly arranged. In addition, an increase in the number of component parts can be restrained.

The front-side reed valve 73 includes the plurality of reed valves (valve bodies 105 and 106) corresponding to the plurality of front-side cylinders 31 that are arranged in a row in the transverse direction of the vehicle. The plurality of reed valves (valve bodies 105 and 106) are arranged in a row in the transverse direction of the vehicle. Therefore, the front pipe line members 81 interconnecting the front-side exhaust pipes (front-side cylinder exhaust pipes 33) and the front-side reed valves (valve bodies 105 and 106) can be compactly and efficiently arranged.

An operation of the aforementioned saddle type vehicle will be described below.

As illustrated in FIG. 3, the intake ducts 51L and 51R are connected respectively to left and right side surfaces of the air cleaner 40. The front-side reed valve 73 is disposed at the front portion 40a of the air cleaner 40, and the rear-side reed valve 74 is disposed at the rear portion 40b of the air cleaner 40. Thus, the intake ducts 51L and 51R, the front-side reed valve 73 and the rear-side reed valve 74 are arranged respectively in different positions, namely, at the side surfaces 40L and 40R, the front portion 40a and the rear portion 40b of the air cleaner 40. Therefore, interference among these components can be prevented from occurring. In addition, the intake ducts 51L and 51R, the front-side reed valve 73 and the rear-side reed valve 74 can be efficiently and compactly arranged.

The front-side reed valve 73 is disposed at the front portion 40a of the air cleaner 40 rearwardly of the head pipe 21, and is arranged so that its longitudinal direction lies along the height direction. On the rear side of the head pipe 21 and on the front side of the air cleaner 40, it is easier to secure a space in the height direction than to secure a space in the transverse direction of the vehicle. Since the front-side reed valve 73 is disposed at the front portion 40a of the air cleaner 40 in such a manner that its longitudinal direction lies along the height direction, the front-side reed valve 73 can be efficiently and compactly arranged.

In addition, the rear-side reed valve 74 is disposed at the rear portion 40b of the air cleaner 40 between the pair of main frames 22, and is arranged so that the longitudinal direction of the rear-side reed valve 74 lies along the transverse direction of the vehicle. On the rear side of the air cleaner 40, it is easier to secure a space in the transverse direction of the vehicle than to secure a space in the height direction.

Since the rear-side reed valve 74 is thus disposed at the rear portion 40b of the air cleaner 40 in such a manner that its longitudinal direction lies along the transverse direction of the vehicle, the rear-side reed valve 74 can be efficiently and compactly arranged. Since the front-side reed valve 73 and the rear-side reed valve 74 can be arranged compactly, an influence of the reed valve 72 on those component parts which are disposed in the surroundings of the reed valve 72 can be reduced.

Referring to FIG. 5 also, in the case body 52 having the dirty side 62 formed on the lower side and the clean side 61 on the upper side, the intake ducts 51L and 51R are connected to the dirty side 62, whereas the secondary air supply system 70 is connected to the clean side 61 on the upper side. Thus, the intake ducts 51L and 51R and the secondary air supply system 70 are connected respectively to the lower side and the upper side of the air cleaner 40. Therefore, the intake ducts 51L and 51R and the secondary air supply system 70 can be spaced apart from each other. As a result, there is no fear of interference between the intake ducts 51L and 51R and the secondary air supply system 70. Thus, it is possible to efficiently arrange the intake ducts 51L and 51R and the secondary air supply system 70.

As illustrated in FIG. 2, the fuel tank 17 is so disposed as to cover a space ranging from the upper side to the rear side of the air cleaner 40 where the secondary air supply system 70 is provided. Thus, the secondary air supply system 70 is covered by the fuel tank 17. Consequently, the secondary air supply system 70 can be protected on the upper side and the rear side thereof.

In addition, the main frames 22 and the front-side reed valve 73 overlap each other in side view of the vehicle. Since the front-side reed valve 73 is arranged so as to be hidden behind the main frames 22 in side view of the vehicle, the front-side reed valve 73 can be protected on the left and right sides thereof.

Furthermore, on a lateral side of the rear igniters 49, the rear pipe line members 82 for interconnecting the rear-side reed valve 74 and the rear-side cylinder exhaust pipes 34 extend from the front side toward the rear side of the vehicle. With the rear pipe line members 82 thus arranged so as not to protrude to the upper side of the rear igniters 49 provided for the rear-side cylinders 32, the rear pipe line members 82 can be arranged compactly and efficiently.

A second embodiment of the present invention will be described below referring to the drawings. Note that the same components in FIG. 13 as those shown in FIG. 11(*a*) are denoted by the same reference symbols used in FIG. 11(*a*), and detailed descriptions of the same components will be omitted here.

Figure 13:
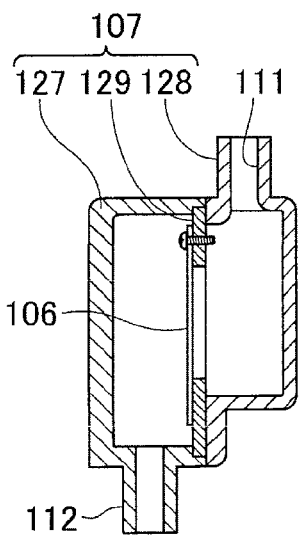
FIG. 13 is a sectional view of a front-side reed valve according to Embodiment 2.

As depicted in FIGS. 10 and 13, a front-side reed valve 73 includes a plurality of reed valves (valve bodies 105 and 106). The valve bodies 105 and 106 are arranged so that the longitudinal direction of the front-side reed valve 73 lies along the height direction. The plurality of reed valves 105 and 106 constituting the front-side reed valve 73 are housed by a front case member 107 provided as a separate body.

The front case member 107 includes one half 127, the other half 128, and a partition portion 129 clamped between the other half 128 and the one half 127. The front case member 107 has the one half 127 fastened to the other half 128 by screws 114 to form the case member 107 as a united body. With the front case member 107 thus configured by the three component parts of the one half 127, the partition portion 129 and the other half 128, the individual component parts can be easily molded. In addition, with the partition portion 129 clamped between the other half 128 and the one half 127, the front case member 107 can be simplified in structure. In addition, the partition portion 129 has an opening in its central portion, where the valve body 106 is provided. When the solenoid valve 71 (see FIG. 3) is opened under predetermined conditions and a negative pressure is exerted on the exhaust port 31*a* (see FIG. 2), the valve body 106 is opened by the negative pressure. Consequently, cleaned air flows from the front input port 111 toward the side of the front first and front second output ports 112 and 113, in the air cleaner 40.

A third embodiment of the present invention will be described referring to the drawings. Note that the same components in FIG. 14 as those depicted in FIG. 11(*a*) are denoted by the same reference symbols as used in FIG. 11(*a*), and detailed description of the same components will be omitted here.

Figure 14:
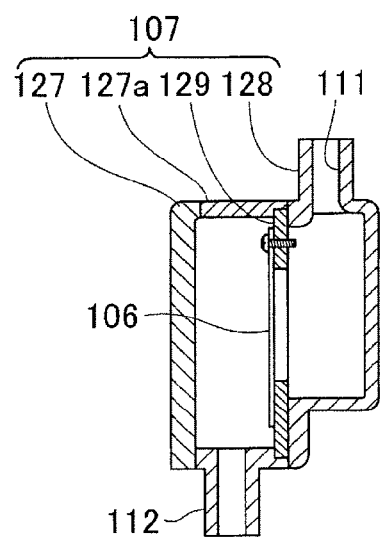
FIG. 14 is a sectional view of a front-side reed valve according to Embodiment 3.

As illustrated in FIGS. 10 and 14, a front-side reed valve 73 includes a plurality of reed valves (valve bodies 105 and 106). The valve bodies 105 and 106 are so arranged that the longitudinal direction of the front-side reed valve 73 lies in the height direction. The plurality of reed valves 105 and 106 constituting the front-side reed valve 73 are housed by a front case member 107 provided as a separate body.

The front case member 107 includes one half 127, a peripheral wall portion 127*a* extending from a peripheral edge of the one half 127, the other half 128, and a partition portion 129 clamped between the other half 128 and the peripheral wall portion 127*a*. The front case member 107 has the one half 127 fastened to the other half 128 by screws 114 to form the case member 107 as a united body. With the front case member 107 thus configured by the four component parts of the one half 127, the peripheral wall portion 127*a*, the partition portion 129 and the other half 128, the individual component parts can be easily molded. In addition, the partition portion 129 has an opening in its central portion, where the valve body 106 is provided. When the solenoid valve 71 (see FIG. 3) is opened under predetermined conditions and a negative pressure is exerted on the exhaust port 31*a* (see FIG. 2), the valve body 106 is opened by the negative pressure. Consequently, cleaned air flows from the front input port 111 toward the side of the front first and front second output ports 112 and 113, in the air cleaner 40.

Note that while the present invention is applied to a motorcycle in the embodiments, the invention can be applied to three-wheeled vehicles, and may be applied to general vehicles.

In addition, the number of the reed valves arranged in the transverse direction of the vehicle may be increased according to the number of the cylinders arranged in the transverse direction of the vehicle. For instance, in the case where three cylinders are arranged in the transverse direction of the vehicle, three reed valves may be arranged in the transverse direction of the vehicle.

The present invention is suitable for application to a motorcycle provided with a secondary air supply system including a reed valve.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle vehicle comprising:
   a body frame;
   an engine mounted on the body frame, the engine including a front-side cylinder directed toward a front side of the vehicle and a rear-side cylinder directed toward a rear side of the vehicle;
   an air cleaner disposed in a space defined between the front-side cylinder and the rear-side cylinder on an upper side of the engine; and
   a secondary air supply system having a reed valve between the air cleaner and an exhaust passage of the engine, the secondary air supply system adapted to supply secondary air from the air cleaner into the exhaust passage of the engine or to stop the supply of the secondary air;
   wherein an intake duct for guiding air into the air cleaner is connected to a lateral side surface, extending across the width of the vehicle, of the air cleaner;
   the reed valve includes a front-side reed valve used for the front-side cylinder and a rear-side reed valve used for the rear-side cylinder; and
   the front-side reed valve is disposed at a front portion of the air cleaner, and the rear-side reed valve is disposed at a rear portion of the air cleaner.

2. The saddle vehicle according to claim 1,
   wherein the air cleaner includes a case body and an element provided inside the case body;
   the case body is partitioned by the element into a clean side and a dirty side, the clean side is formed on an upper side of the case body, and the dirty side is formed on a lower side of the case body; and
   the intake duct is connected to the dirty side, and the secondary air supply system is connected to the clean side.

3. The saddle vehicle according to claim 1,
   wherein the secondary air supply system is further provided with a solenoid valve adapted to supply air in the clean side to the secondary air supply system or to stop the supply of the air, with the solenoid valve and the front-side reed valve being interconnected by an upstream-side front pipe line, and with the solenoid valve and the rear-side reed valve being interconnected by an upstream-side rear pipe line; and a ceiling wall of the air cleaner is formed with a stepped portion provided with a difference in height, and the solenoid valve, the upstream-side front pipe line and the upstream-side rear pipe line are disposed on the side of a lower part of the stepped portion.

4. The saddle vehicle according to claim 2,
wherein the secondary air supply system is further provided with a solenoid valve adapted to supply air in the clean side to the secondary air supply system or to stop the supply of the air, with the solenoid valve and the front-side reed valve being interconnected by an upstream-side front pipe line, and with the solenoid valve and the rear-side reed valve being interconnected by an upstream-side rear pipe line; and a ceiling wall of the air cleaner is formed with a stepped portion provided with a difference in height, and the solenoid valve, the upstream-side front pipe line and the upstream-side rear pipe line are disposed on the side of a lower part of the stepped portion.

5. The saddle vehicle according to claim 1, wherein the case body is formed, at a front-side lower portion thereof, with a recessed portion in which to dispose the front-side reed valve in such a manner as to surround the front-side reed valve by a wall portion of the case body.

6. The saddle vehicle according to claim 5, wherein the recessed portion is provided with a projection for positioning the front-side reed valve.

7. The saddle vehicle according to claim 2, wherein a stay member for fastening and fixing the rear-side reed valve is provided on a rear wall of the case body.

8. The saddle vehicle according to claim 3, wherein a stay member for fastening and fixing the rear-side reed valve is provided on a rear wall of the case body.

9. The saddle vehicle according to claim 2,
wherein the case body is divided into an upper portion and a lower portion, with a parting face thereof being slanted with respect to a longitudinal direction of the vehicle; and the front-side reed valve is disposed on a lower half of the case body, with the front-side reed valve and the rear-side reed valve being arranged at substantially equal heights.

10. The saddle vehicle according to claim 3,
wherein the case body is divided into an upper portion and a lower portion, with a parting face thereof being slanted with respect to a longitudinal direction of the vehicle; and the front-side reed valve is disposed on a lower half of the case body, with the front-side reed valve and the rear-side reed valve being arranged at substantially equal heights.

11. The saddle vehicle according to claim 1,
wherein the body frame includes a head pipe, and a pair of main frames extending rearwardly from the head pipe;
the engine and the air cleaner are disposed between the pair of main frames; and
the pair of main frames and the front-side reed valve overlap each other in side view of the vehicle.

12. The saddle vehicle according to claim 2,
wherein the body frame includes a head pipe, and a pair of main frames extending rearwardly from the head pipe;
the engine and the air cleaner are disposed between the pair of main frames; and
the pair of main frames and the front-side reed valve overlap each other in side view of the vehicle.

13. The saddle vehicle according to claim 1,
wherein the front-side cylinder includes a plurality of cylinders arranged in a row in a transverse direction of the vehicle;
the front-side reed valve includes a plurality of reed valves arranged in a row in the transverse direction of the vehicle; and
the plurality of front-side reed valves are housed by a united case member.

14. The saddle vehicle according to claim 2,
wherein the front-side cylinder includes a plurality of cylinders arranged in a row in a transverse direction of the vehicle;
the front-side reed valve includes a plurality of reed valves arranged in a row in the transverse direction of the vehicle; and
the plurality of front-side reed valves are housed by a united case member.

15. The saddle vehicle according to claim 1,
wherein the rear-side cylinder includes a plurality of cylinders arranged in a row in a transverse direction of the vehicle;
the rear-side reed valve includes a plurality of reed valves arranged in a row in the transverse direction of the vehicle; and
the plurality of rear-side reed valves are housed by a united case member.

16. The saddle vehicle according to claim 2,
wherein the rear-side cylinder includes a plurality of cylinders arranged in a row in a transverse direction of the vehicle;
the rear-side reed valve includes a plurality of reed valves arranged in a row in the transverse direction of the vehicle; and
the plurality of rear-side reed valves are housed by a united case member.

17. The saddle vehicle according to claim 1, wherein a fuel tank is disposed on the saddle type vehicle in such a manner as to cover an area ranging from an upper side of the air cleaner toward a rear side of the vehicle.

18. An air supply for a saddle vehicle comprising:
an engine including a front-side cylinder directed toward a front side of the vehicle and a rear-side cylinder directed toward a rear side of the vehicle;
an air cleaner disposed in a space defined between the front-side cylinder and the rear-side cylinder on an upper side of the engine; and
a secondary air supply system having a reed valve between the air cleaner and an exhaust passage of the engine, the secondary air supply system adapted to supply secondary air from the air cleaner into the exhaust passage of the engine or to stop the supply of the secondary air;
wherein an intake duct for guiding air into the air cleaner is connected to a lateral side surface, extending across the width of the vehicle, of the air cleaner;
the reed valve includes a front-side reed valve used for the front-side cylinder and a rear-side reed valve used for the rear-side cylinder; and
the front-side reed valve is disposed at a front portion of the air cleaner, and the rear-side reed valve is disposed at a rear portion of the air cleaner.

19. The air supply for a saddle vehicle according to claim 18,
wherein the air cleaner includes a case body and an element provided inside the case body;

the case body is partitioned by the element into a clean side and a dirty side, the clean side is formed on an upper side of the case body, and the dirty side is formed on a lower side of the case body; and the intake duct is connected to the dirty side, and the secondary air supply system is connected to the clean side.

20. The air supply for a saddle vehicle according to claim 18, wherein the secondary air supply system is further provided with a solenoid valve adapted to supply air in the clean side to the secondary air supply system or to stop the supply of the air, with the solenoid valve and the front-side reed valve being interconnected by an upstream-side front pipe line, and with the solenoid valve and the rear-side reed valve being interconnected by an upstream-side rear pipe line; and a ceiling wall of the air cleaner is formed with a stepped portion provided with a difference in height, and the solenoid valve, the upstream-side front pipe line and the upstream-side rear pipe line are disposed on the side of a lower part of the stepped portion.

* * * * *